United States Patent [19]

Ashkin et al.

[11] 4,327,288

[45] Apr. 27, 1982

[54] METHOD FOR FOCUSING NEUTRAL ATOMS, MOLECULES AND IONS

[75] Inventors: Arthur Ashkin, Rumson; John E. Bjorkholm, Holmdel; Richard R. Freeman, Middletown, all of N.J.; David B. Pearson, Staten Island, N.Y.

[73] Assignee: Bell Telephone Laboratories, Incorporated, Murray Hill, N.J.

[21] Appl. No.: 192,343

[22] Filed: Sep. 29, 1980

[51] Int. Cl.$^3$ .................................... H01S 1/00

[52] U.S. Cl. .................................... 250/251

[58] Field of Search .................... 250/251, 281; 55/1-2; 204/157.1

[56] References Cited

U.S. PATENT DOCUMENTS

| | | | |
|---|---|---|---|
| 3,532,879 | 10/1970 | Braunstein | 250/251 |
| 3,558,877 | 1/1971 | Pressman | 250/251 |
| 3,710,279 | 1/1973 | Ashkin | 250/251 |
| 3,778,612 | 12/1973 | Ashkin | 250/251 |
| 4,115,078 | 9/1978 | Jamer et al. | 250/251 |

OTHER PUBLICATIONS

"Effects of Gradient of a Strong Electromagnetic Beam of Electrons and Atoms", G. A. Askar'yan, *Soviet Physics JETP,* vol. 15, No. 6, Dec. 1962, pp. 1088-1090.

"Atomic-Beam Deflection and Broadening by Recoils Due to Photon Absorption or Emission", Picque et al., *Optics Comm.,* vol. 5, No. 5, Aug. 1972, pp. 402-406.

"Motion of Atoms in a Radiation Trap", Ashkin et al., *Phys. Rev. A,* vol. 21, No. 5, May 1980, pp. 1606-1617.

"Observation of Focusing of Neutral Atoms by the Dipole Forces of Resonance-Radiation Pressure", Ashkin et al., *Phys. Rev. Letter,* vol. 41, No. 20, Nov. 1978, pp. 1361-1364.

"Observation of Dipole Forces Exerted on Neutral Atoms by Intensity Gradients of Resonant Light", Ashkin et al., *J. Optical Soc. of America,* vol. 68, No. 10, Oct. 1978, pp. 1377-1378.

"Transverse Resonance-Radiation Pressure on Atomic Beams and Influence of Fluctuations", Bjorkholm et al., *Laser Spect. IV,* Oct. 1979, pp. 49-55.

"Focusing and Defocusing of Neutral Atomic Beams Using Resonance-Radiation Pressure", Pearson et al., *Appl. Phys. Lett.,* vol. 36, No. 1, Jan. 1980, pp. 99-101.

"Experimental Observation of the Influence of the Quantum Fluctuations of Resonance-Radiation Pressure", Ashkin et al., *Optics Lett.,* vol. 5, No. 3, Mar. 1980, pp. 111-113.

*Primary Examiner*—Bruce C. Anderson

*Attorney, Agent, or Firm*—Michael B. Einschlag

[57] ABSTRACT

A cw laser beam of radiation superimposed upon a beam of particles, for example a beam of neutral particles, can cause substantial changes in particle trajectories when the radiation frequency is tuned near a resonant transition in the particle. The particles can be confined by, ejected from, or steered by the laser beam. The present invention teaches the range of values over which the frequency of electromagnetic radiation is to be offset from the frequency of a particle resonance, as a function of radiation power for specific wave propagation modes, to produce best focusing of the particle beam by a copropagating beam of electromagnetic radiation. Our invention takes into account the effect of random fluctuations which arise out of the quantum nature of the electromagnetic wave-particle interaction in order to determine the appropriate range of values.

8 Claims, 9 Drawing Figures

METHOD FOR FOCUSING NEUTRAL ATOMS, MOLECULES AND IONS

BACKGROUND OF THE INVENTION

This invention pertains to the field of focusing particle beams and more particularly, to the focusing of particle beams by means of laser radiation.

An article entitled "Effects of the Gradient of a Strong Electromagnetic Beam on Electrons and Atoms", *Soviet Physics JETP*, Vol. 15, No. 6, December 1962, pp. 1088–1090, by G. A. Askar'yan discloses the fact that a transverse force is produced on electrons and atoms by a gradient of the intensity of an electromagnetic beam. It also discloses that particles will be pulled into the beam if the frequency of the radiation is below a resonance of the particle, whereas the particles will be forced out of the radiation if the frequency is above the resonance. This effect can be used to create either a rarefaction or a compression of the particle beam at the focus of the radiation.

An article entitled "Observation of Focusing of Neutral Atoms by the Dipole Forces of Resonance-Radiation Pressure", *Physical Review Letters*, Vol. 41, No. 20, Nov. 13, 1978, pp. 1361–1364 by J. E. Bjorkholm, R. R. Freeman, A. Ashkin and D. B. Pearson demonstrated the above-described effect with a sodium atomic beam and a co-propagating resonant cw laser radiation.

SUMMARY OF THE INVENTION

A cw laser beam of radiation superimposed upon a beam of particles, for example a beam of neutral particles, can cause substantial changes in particle trajectories when the radiation frequency is tuned near a resonant transition in the particle. The particles can be confined by, ejected from, or steered by the laser beam. The present invention pertains to focusing of particle beams by light and specifies in claims 1 and 3 the range of values over which the frequency of electromagnetic radiation is to be offset from the frequency of a particle resonance, as a function of radiation power for specific wave propagation modes, to produce the minimum focal spots for the focused particles. Our invention takes into account the effect of random fluctuations which arise out of the quantum nature of the electromagnetic wave-particle interaction in order to determine the appropriate range of values.

BRIEF DESCRIPTION OF THE DRAWING

A complete understanding of the present invention may be gained from a consideration of the detailed description presented hereinbelow in connection with the accompanying diagram in which.

DETAILED DESCRIPTION

Figure 1:
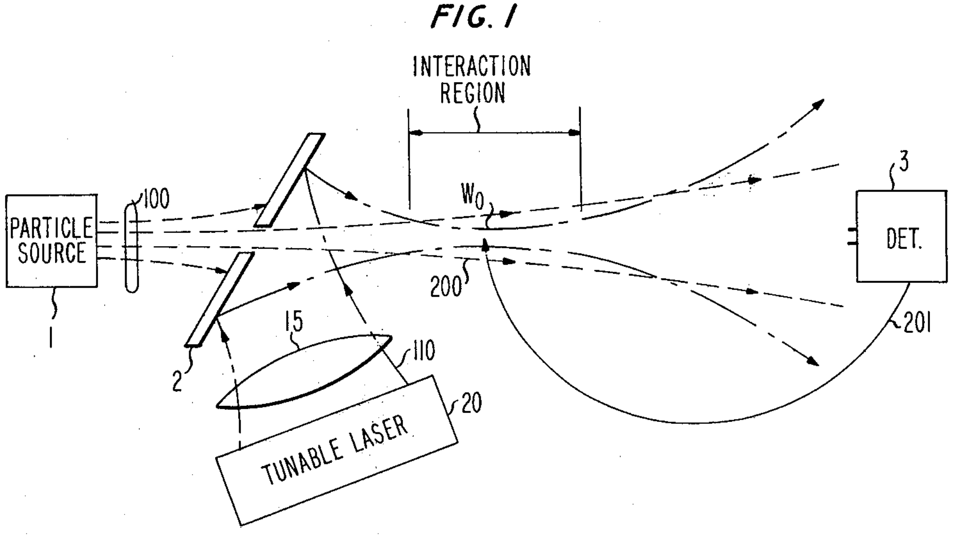
FIG. 1 shows, in pictorial form, an embodiment of the present invention utilizing a mirror and a tunable laser to provide a laser beam that co-propagates with a beam of atomic particles.

A cw laser beam of radiation superimposed upon and copropagating with a beam of particles, for example, a beam of neutral atoms, can cause substantial changes in particle trajectories when the radiation frequency is tuned near a resonant transition in the particle, for example, an atomic resonance. The particles can be confined by, ejected from, or steered by the laser beam. These effects are produced by the transverse dipole resonance-radiation pressure (DRRP) forces exerted on an induced dipole by an electric field gradient. DRRP arises from stimulated light-scattering processes and exists only in an electromagnetic field gradient. DRRP differs fundamentally from spontaneous resonance-radiation pressure (SRRP). SRRP arises from spontaneous light-scattering and exists even in uniform resonant electromagnetic fields.

We have discovered that the minimum focal spot size of a particle beam for a given laser power is limited by the random fluctuations which arise out of the quantum nature of the light-particle interaction. We have tested our invention in an apparatus first disclosed in an article entitled, "Observation of Focusing of Neutral Atoms by the Dipole Forces of Resonance-Radiation Pressure", *Physical Review Letters*, Vol. 41, No. 20, Nov. 13, 1978, pp. 1361–1364, by J. E. Bjorkholm, R. R. Freeman, A. Ashkin and D. B. Pearson and shown in FIG. 1. Beam 100 of neutral sodium atoms emanates from oven 1. Beam 100 passes through a 230 μm hole in 3 mm thick dielectric coated mirror 2 to form collimated particle beam 200. Light beam 110, from continuously tunable, single-mode cw dye laser 20, is focused by lens 15 onto mirror 2. After reflection from mirror 2, beam 110 co-propagates with atomic beam 200. Lens 15, a 75 cm lens, provides a focal spot size $w_0 = 100$ μm at a point 25 cm from mirror 2 indicated by arrow 201. The spot size of laser beam 110 at mirror 2 is 500 μm. The confocal parameter of the laser beam 110 is 10 cm. Mirror 2 is placed in the far field of laser beam 110 so that the dark spot in the center of reflected laser beam 110, caused by the hole in mirror 2, is totally washed out in the near field of the light. Thus, the light intensity distribution of beam 110 is nearly Gaussian in the central 20 cm interaction region shown in FIG. 1 where the bulk of the interaction between the atoms of beam 200 and the radiation of beam 110 occurs.

The laser was tuned near 5890 Å in order to excite the $3^2S_{\frac{1}{2}} \rightarrow 3^2P_{3/2}$ resonance transition of the sodium atoms and the atomic-beam profile was measured by movable hot ware detector 3, which detector was placed in the interaction region at the location indicated by arrow 201.

Figure 2:
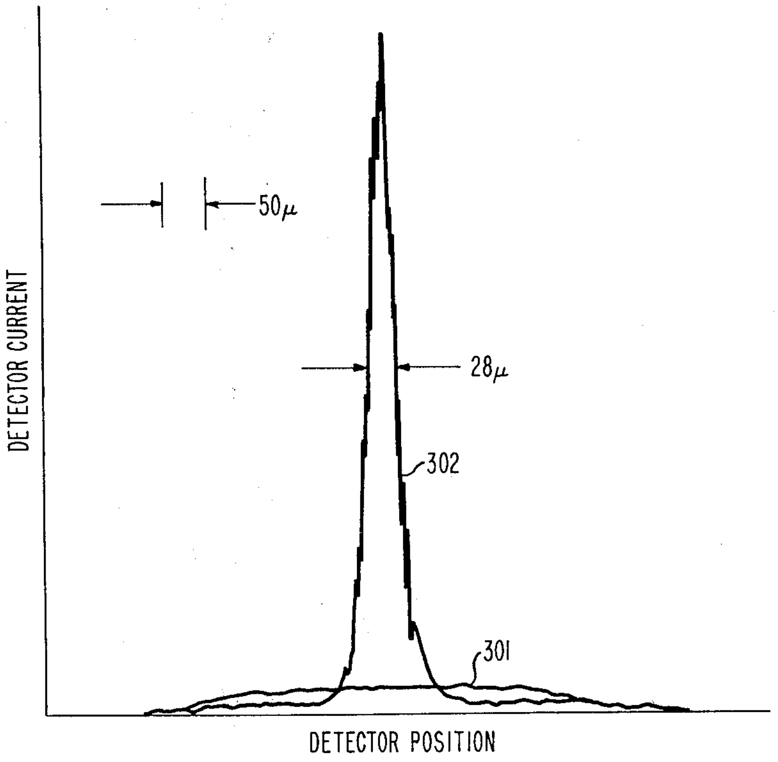
FIG. 2 shows, in graphical form, the atomic beam current measured by hot wire detector 3 of FIG. 1 (where hot wire detector 3 was placed according to arrow 201 at the center of the interaction region) as a function of detector position transverse to the direction of propagation of particle beam 200, curve 301 being obtained in the absence of laser radiation and curve 302 being obtained when a laser beam of 190 mW power was tuned according to the present invention.

First, the laser power, P, was fixed and the laser frequency was adjusted in order to maximize the on-axis intensity of the focused atomic sodium beam. Then, the atomic beam profile was scanned transversely to the direction between mirror 2 and detector 3 to produce a measurement of the minimum spot size, $R_{min}$, as a function of the frequency difference $\Delta\nu_{opt}$ between the laser beam and the atomic resonance. The result of one such measurement is shown in FIG. 2 for P = 190 mW. In the atomic restframe we had $\Delta\nu_{opt} = -8$ GHz relative to the $3S_{\frac{1}{2}}(F=2) \rightarrow 3P_{3/2}$ resonance transition. FIG. 2 shows that $R_{min} = 28\mu$ and that the on-axis atomic beam intensity of curve 302 was enhanced by a factor of 27 relative to the on-axis atomic beam intensity of curve 301, which curve was produced in the absence of laser radiation. This result was obtained without velocity selection in the atomic beam. The resolution of detector 3 was determined by its circular 30μ diameter aperture. The scan in FIG. 2 is a fairly accurate reproduction of the actual atomic beam profile because use of smaller apertures in detector 3 resulted in no appreciable changes in the shape of curve 302.

Similar scans of the focused atomic beam profile were taken with laser powers ranging from 15 mW to 200 mW. In each case, the tuning of the laser was adjusted to maximize the on-axis atomic beam intensity. The results are displayed by the circles in FIGS. 3 and 4 where the power dependence of $R_{min}$ and $\Delta\nu_{opt}$, are plotted respectively. The closed circle data points in FIGS. 3 and 4 were obtained with velocity selection and the open circle data points were obtained without velocity selection.

Figure 5:
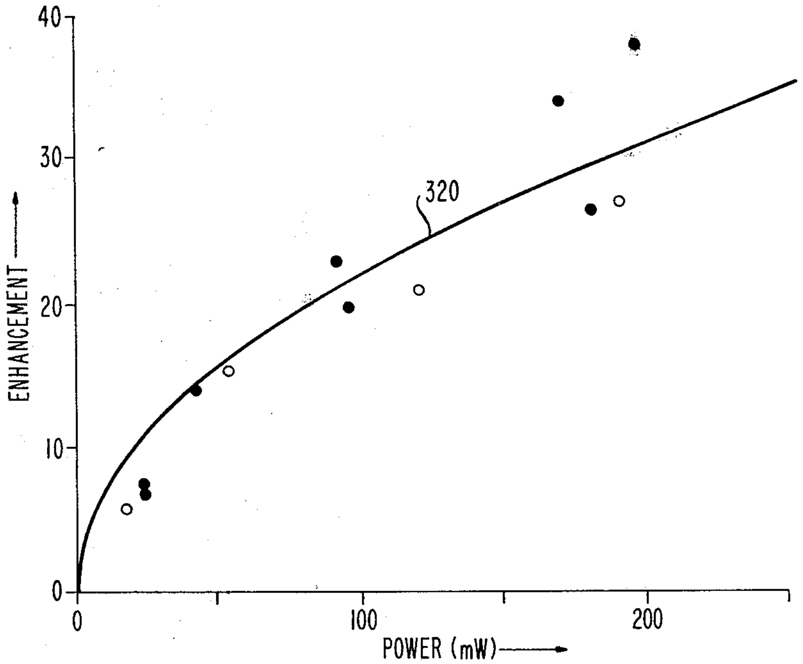
FIG. 5 shows, in graphical form, the enhancement of the on-axis intensity of an atomic beam over that obtained with no laser radiations for an atomic beam having a half-angular divergence $\Delta\theta = 1.8 = 10^{-4}$ rad and a most probable atomic particle velocity of $v_0 = 9\times10^4$ cm/sec with a $TEM_{00}$ mode laser beam having a focal spot size $w_0 = 100\mu$ as a function of laser power, the closed circle data points being obtained with velocity selection in the particle beam and the open circle data points being obtained without velocity selection.

FIG. 5 shows the enhancement in on-axis intensity in the atomic beam as a function of laser power over that obtained without a laser.

Our invention teaches the range of values over which the frequency of electromagnetic radiation is to be offset from the frequency of a particle resonance, as a function of radiation power for specific wave propagation modes, to produce best focusing of the particle beam by a superimposed beam of electromagnetic radiation. Our invention properly takes into account the effect of random fluctuations which arise out of the quantum nature of the electromagnetic wave-particle interaction in order to determine the appropriate range of values.

The following develops a heuristic model that describes the focusing effects defined by the present invention and how these effects are distinguishable over the prior art. The data displayed in FIGS. 2–5 were obtained using a $TEM_{00}$ mode laser beam. However, we will also discuss how the heuristic model applies to the use of a $TEM^*_{01}$ mode laser beam to guide particle beams. Curve 350 in FIG. 6 represents the intensity profile of a $TEM^*_{01}$ laser beam.

Figure 6:
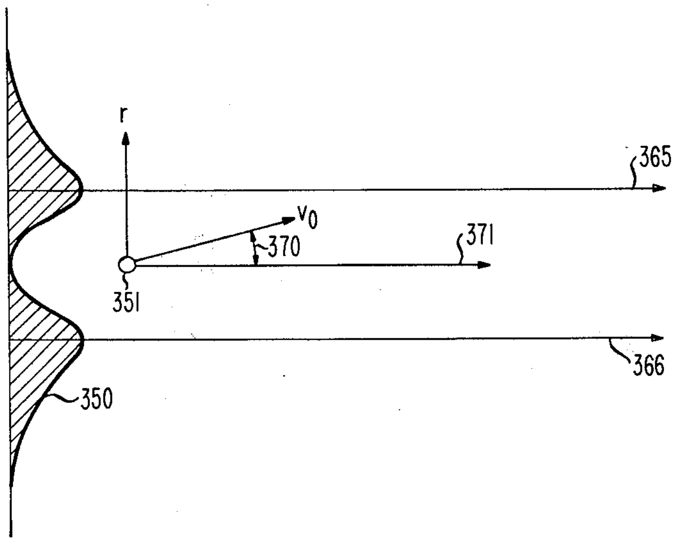
FIG. 6 shows, in pictorial form, the intensity profile of a $TEM^*_{01}$ mode laser beam.

FIG. 6 shows the pertinent coordinate system to be used when particle 351 is injected with longitudinal velocity $v_0$ into a laser beam at z=0. The laser beam travels along the direction shown by arrow 365 and 366. Injection occurs on the laser beam axis, i.e. at r=0, and the particle motion is at a small angle 370, having a value of $\Delta\theta$, with respect to the z axis defined by arrow 371. the particles are guided over a distance L by DRRP and we will calculate the particle beam spot size at z=L due to this guiding. For simplicity we restrict our attention to collimated light beams.

To semiquantitatively calculate the radial extent to which the particles are confined at z=L we envision the particles as being transversely confined in the transverse potential well given by:

$$V(r) = \tfrac{1}{2} h\Delta\nu \ln(1 + p(r)) \quad (1)$$

where $\Delta\nu$ is the laser detuning from the particle resonance and equals $\nu - \nu_0$, $\nu$ being the laser frequency in the particle restframe and $\nu_0$ being the particle resonance frequency, h is Planck's constant, and p(r) is called the "saturation parameter". For an idealized two-level atom p(r) is given by:

$$p(r) = \frac{\lambda^3 \Delta\nu_N}{8\pi^2 hc} \; \frac{I(r)}{\Delta\nu^2 + \Delta\nu_N^2/4} \quad (2)$$

where $\Delta\nu_N$ is the natural linewidth (FWHM) of the atomic resonance, c is the speed of light, λ is wavelength of the laser radiation and I(r) is the light intensity as a function of r, the radical coordinate. For $r << w_0$ ($w_0$ is the laser spot size) the particle sees essentially a harmonic potential. The range of r's over which the atom oscillates is determined by the maximum transverse kinetic energy of the atom, $E_t$:

$$E_t = \tfrac{1}{2} m v_t^2 \quad (3)$$

where $v_t$ is the transverse velocity of the atom at r=0. The transverse velocity is determined by the initial transverse velocity of the atom plus the additional velocity which arises out of heating of the atom by quantum fluctuations.

For a given $E_t$ the atom oscillates over the range $-R \leqq r \leqq R$, where we have the relationship $$p(R) = [1 + p(0)]\exp[2E_t/h\Delta\nu] - 1. \quad (4)$$

EQ. 4 is the fundamental equation that we use to determine the atomic beam spot diameter, 2R. (This model assumes the dipole forces are strong enough to confine essentially all the particles in the particle beam.)

First we treat the $TEM_{00}$ or Gaussian laser mode. For this mode the laser intensity is given by:

$$I(r)=(2P/\pi w_0^2)e^{-2r^2/w_0^2} \quad (5)$$

where P is the laser beam power. This gives:

$$p(r) = \frac{\lambda^3 \Delta\nu_N}{4\pi^3 hc} \frac{P}{w_0^2} \frac{1}{\Delta\nu^2 + \Delta\nu_N^2/4} e^{-2r^2/w_0^2} \quad (6)$$

$$= p(0)e^{-2r^2/w_0^2} \quad (7)$$

From EQ. 4, $$R^2 = -\frac{w_0^2}{2} \ln\left[\frac{1}{p(0)}\left\{(1+p(0))\exp\left[\frac{2E_t}{h\Delta\nu}\right]-1\right\}\right] \quad (8)$$

For the $TEM_{00}$ mode only the quantum fluctuations of the spontaneous force are significant. The approximate upper bound for $E_t$ is evaluated by assuming that the transverse speed of a particle as it travels along the light beam is determined by two factors. The first factor is the maximum initial transverse speed of the particle. We take this initial transverse speed to be $v_0\Delta\theta$, where $\Delta\theta$, the value of angle 370 in FIG. 6, is the half-angular divergence of the particle beam. The second factor is the transverse heating of the particle caused by the fluctuations of the spontaneous force. These fluctuations add to the transverse velocity, $v_t$, in a random-walk fashion with a stepsize that varies between 0 and $h/m\lambda$, where m is the particle mass, and at the rate at which photons are spontaneously scattered. If we assume an isotropic scattering of the light by particles, after N scattering events the transverse velocity distribution is proportional to $$\exp[-(v_t - v_0\Delta\theta)^2/(2h^2N/3m^2\lambda^2)]. \quad (9)$$

Thus, an approximate upper bound on $v_t$ is $$[\langle v_t^2\rangle]^{\frac{1}{2}} = v_0\Delta\theta + (h/m\lambda)(N/3)^{\frac{1}{2}}. \quad (10)$$

We loosely consider this to be a typical transverse velocity for atoms in an atomic beam. The random variable N is approximated by its mean;

$$N=(L/v_0)(p_{AVE}/2\tau) \quad (11)$$

where $\tau=1/(2\pi\Delta\nu_N)$ is the natural lifetime of the atomic transition and $p_{AVE}$ is the average value of p as the particle passes through the interaction region.

To obtain the solution for R it is necessary to approximately evaluate $p_{AVE}$ in EQ. (11). This is done by considering the transverse motion of the atom within the harmonic ($r<<w_0$) potential well V(r). The initial amplitude of the atomic oscillation is determined by the initial transverse velocity, $v_0\Delta\theta$, and we assume that it is much less than $w_0$. Accordingly, we obtain $p_{AVE}=p(0)$ for the $TEM_{00}$ mode. Thus:

$$N = (\lambda^2\Delta\nu_N^2/2\pi hc)\left(\frac{P}{v_0}\right)\left(\frac{1}{\Delta\nu^2 + \Delta\nu_N^2/4}\right) \quad (12)$$

The confocal parameter of the laser beam, $2\pi w_0^2/\lambda$, must equal or exceed L for the collimated laser beam approximation to be valid. The smallest values for R are obtained for $L=2\pi w_0^2/\lambda$ and we hereinafter use this relationship.

Using $E_t=\frac{1}{2}m\langle v_t^2\rangle$ and EQS. 10–12 we find:

$$\frac{2E_t}{h\Delta\nu} = \frac{mv_0^2\Delta\theta^2}{h\Delta\nu}\left[1+\left(\frac{h\Delta\nu_N^2}{6\pi m^2 c}\frac{P}{v_0^3\Delta\theta^2}\right)^{\frac{1}{2}}\left(\frac{1}{\Delta\nu^2+\Delta\nu_N^2/4}\right)^{\frac{1}{2}}\right]^2 \quad (13)$$

This equation, in conjunction with EQ. 4, yields the solution for 2R as a function of the various parameters. For the $TEM_{00}$ mode the following useful approximations are usually valid: $r<<w_0$, $\Delta\nu>>\Delta\nu_N$, $p(0)<<1$, and $(2E_t/h\Delta\nu)<<1$. In these approximations, $$R^2 \approx -\frac{1}{p(0)}\frac{E_t}{h\Delta\nu}w_0^2 \quad (14)$$

where $\Delta\nu<0$ in order for particles to be confined to $r=0$ by a harmonic restoring force in a $TEM_{00}$ mode. Thus, for this approximation, we obtain $$R^2 = -\frac{4\pi^3 c}{\lambda^3\Delta\nu_N}\frac{w_0^4}{P}\Delta\nu E_t \quad (15)$$

$$= -\frac{2\pi^3 c}{\lambda^3\Delta\nu_N}\frac{mv_0^2\Delta\theta^2 w_0^4}{P}\left[1+\frac{a}{\Delta\nu}\right]^2 \Delta\nu$$

where $$a = \left(\frac{h\Delta\nu_N^2}{6\pi m^2 c}\frac{P}{v_0^3\Delta\theta^2}\right)^{\frac{1}{2}}.$$

The minimum value of R, $R_{min}$, is obtained at $\Delta\nu_{opt}$ given by:

$$(\Delta\nu)_{opt} = -a = -\left(\frac{h\Delta\nu_N^2}{6\pi m^2 c}\frac{P}{v_0^3\Delta\theta^2}\right)^{\frac{1}{2}} \quad (16)$$

and $$2R_{min} = \left(\frac{512\pi^5 hc}{3\lambda^6}\frac{v_0\Delta\theta^2}{P}\right)^{\frac{1}{4}} w_0^2 \quad (17)$$

Figure 7:
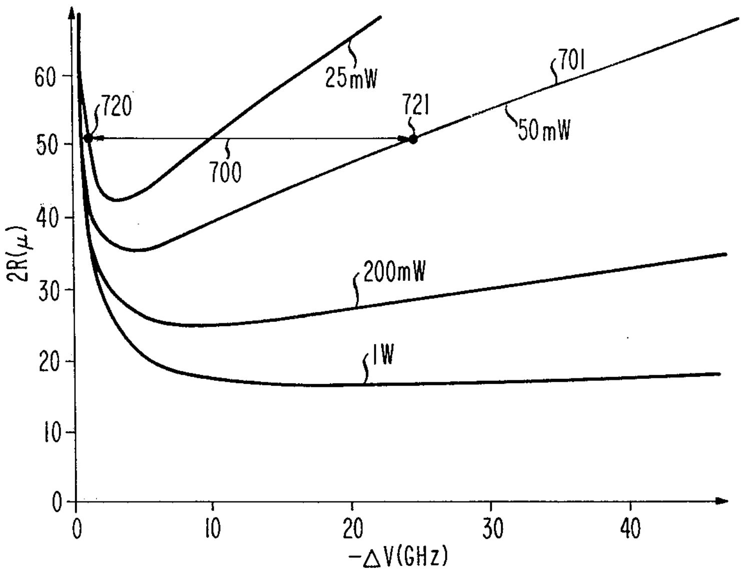
FIG. 7 shows, in graphical form, the values of atomic beam diameter expected for a $TEM_{00}$ mode laser beam as a function of laser detuning from resonance for various values of laser power and specific values of laser beam and atomic beam parameters.

FIG. 7 shows plots of 2R, the particle beam spot size, obtained by using EQ. (15). This is shown as a function of laser detuning for several values of laser power from EQ. 15. EQ. 16 denotes the specific value of laser detuning from particle resonance, $\Delta\nu$, which produces the minimum value of 2R at a specific value of laser power.

FIG. 7 also illustrates the manner in which our invention is an improvement over the prior art. One can compute the optimum value of laser detuning predicted by neglecting quantum fluctuations. We use EQ. 8 and plug in $E_t=\frac{1}{2}m\, v_0^2\, \Delta\theta^2$ with p(0) obtained from EQ. 6. This yields 2R as a function of $\Delta\nu$ for the case of no quantum heating. The minimum value of 2R occurs for ($\Delta\nu_{opt}$) no heat. As an example, if we make the approximation that $\Delta\nu>>\Delta\nu_N$ and $m\, v_0^2\, \Delta\theta^2<<h\, \Delta\nu$ we find that $$(\Delta\nu_{opt})\text{no heat} = \left(\frac{\lambda^3\Delta\nu_N}{4\pi^3 hc}\,\frac{P}{w_0^2}\right)^{\frac{1}{2}} \quad (18)$$

Now look at FIG. 7 and find the intersection of the value of $(\Delta\nu_{opt})$ no heat and curve 701, i.e. point 720. Then draw a horizontal line, line 700 which again intersects curve 701, at point 721. The detuning range between point 720 and 721 represents the range of detuning covered by our invention. This range also corresponds to values of detuning for which the spot size is smaller than that obtained from using $(\Delta\nu_{opt})$ no heat.

Now let us apply our methodology to the TEM*$_{01}$ mode. For the TEM*$_{01}$ mode, in order to evaluate $p_{AVE}$, it is necessary to take a closer look at the oscillation of the atom in the potential well. This is because $p(r=0)=0$. Since the potential appears harmonic, we use $$r(t) = r_0 \sin\sqrt{\frac{K}{m}}\,t \quad (19)$$

where $$K = \frac{\lambda^3\Delta\nu_N}{2\pi^3 c}\,\frac{P}{w_0^4}\,\frac{\Delta\nu}{\Delta\nu^2 + \Delta\nu_N^2/4}$$

where $$F_{dipole} = -Kr$$

and $$I(r) = \frac{2r^2}{w_0^2}\,\frac{2P}{\pi w_0^2}\,e^{-2r^2/w_0^2}. \quad (20)$$

For $r_0$ we use the amplitude determined by the initial transverse velocity. That is, $$r_0^2 = (m/K)v_0^2\Delta\theta^2. \quad (21)$$

From this we determine that $$\bar{p} = mv_0^2\Delta\theta^2/2h\Delta\nu. \quad (22)$$

For the TEM*$_{01}$ mode the magnitude of the quantum fluctuations of the spontaneous force are greatly reduced and it becomes necessary to utilize the momentum diffusion constant defined in an article entitled "Motion of Atoms in a Radiation Trap", *Phys. Review A*, Vol. 21, No. 5, May 1980 by J. P. Gordon and A. Ashkin, pp. 1606-1617 in our analysis.

$$[(v_t)\,rms]^2 = \frac{1}{3m^2}\,\bar{D}_p\,\frac{2\pi\,w_0^2}{\lambda\,v_0}. \quad (23)$$

We obtain:

$$\frac{2E_t}{h\Delta\nu} = \frac{mv_0^2\Delta\theta^2}{h\Delta\nu}\left[1 + \frac{d}{\Delta\nu^{\frac{1}{2}}}\left\{1 + a\frac{\Delta\nu}{\Delta\nu^2 + \frac{\Delta\nu_N^2}{4}} + b\frac{1}{\Delta\nu^2}\right\}^{\frac{1}{2}}\right]^2 \quad (24)$$

-continued where $$d = \left[\frac{\pi^2 h\Delta\nu_N w_0^2}{3m\lambda^3\nu_0}\right]^{\frac{1}{2}} \quad (25)$$

$$a = \frac{\lambda^5\Delta\nu_N}{8\pi^5 cmv_0^2\Delta\theta^2}\,\frac{P}{w_0^4}$$

$$b = \frac{5\lambda^5 m^2 v_0^4\Delta\theta^4}{32\pi^5 ch^3\Delta\nu_N}\,\frac{P}{w_0^4}$$

We will find that minimum values of R occur for $\Delta\nu \approx 10$ MHz and consequently it is not usually valid to assume $(mv_0^2\Delta\theta^2/2h\Delta\nu) << 1$ or $\Delta\nu >> \Delta\nu_N$. The only reasonable approximation is $r << w_0$. From EQ. 4 and 20 we find:

$$R^2 = \frac{w_0^2}{2}\,\frac{1}{p(0)}\left[\exp\left\{\frac{2E_t}{h\Delta\nu}\right\} - 1\right] \quad (26)$$

$$= \frac{w_0^4}{P}\,\frac{2\pi^3 hc}{\lambda^3\Delta\nu_N}\left(\Delta\nu^2 + \frac{\Delta\nu_N^2}{4}\right)\left[\exp\left\{\frac{2E_t}{h\Delta\nu}\right\} - 1\right]$$

We must use this equation and EQ. 24 for $2E_t/h\Delta\nu$ and we really should not make further approximations since we are interested in the region $\Delta\nu \approx \Delta\nu_N$.

To solve for the region of detuning covered by our invention we utilize a similar technique described hereinabove for the TEM$_{00}$ mode where we find the values for $(\Delta\nu_{opt})$ no heat. We use EQ. 26 and $E_t = m\,v_0^2\,\Delta\theta^2/2$. This will provide the solution $R(\Delta\nu)$ for the no-heating case. The minimum value of R is obtained for $(\Delta\nu_{opt})$ no heat. Once again we obtain the range of detuning values covered by this invention from the intersection of the values of $(2R_{opt})$ no heat and the curve of 2R using EQ. 26 with $E_t$ as given by EQ. 24.

Figure 8:
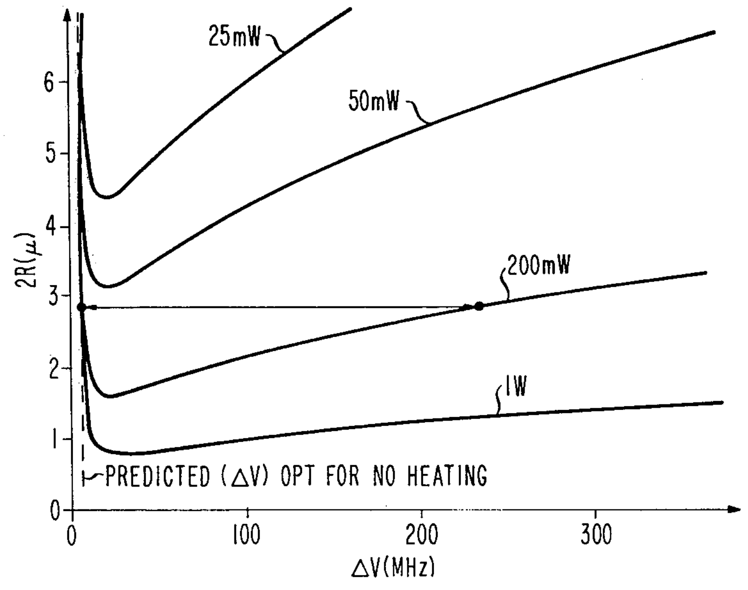
FIG. 8 shows, in graphical form, the values of atomic beam diameter expected for a $TEM^*_{01}$ mode laser beam as a function of laser detuning from resonance for various values of laser power and specific values of laser beam and atomic beam parameters.

In FIG. 8 we plot 2R obtained by using EQ. 26. This is shown as a function of laser detuning for several values of laser power. Here we again note the effect first observed in FIG. 7 that we can achieve smaller beam spot sizes by detuning in accordance with the predictions of our invention which includes the effects of quantum fluctuations than if they are not taken into account. Note that the value of $(\Delta\nu_{opt})$ no heat for minimizing 2R in the absence of heating is independent of P and only depends on $\Delta\nu_N$ and m $v_0^2$ $\Delta\nu^2$.

Along with the discussion presented hereinabove which highlighted our invention we note that the minimum spot sizes achievable in the TEM*$_{01}$ mode appear to be an order of magnitude smaller than those achievable for the TEM$_{00}$ mode. This is illustrated by examining the left axes in FIGS. 7 and 8.

Figure 3:
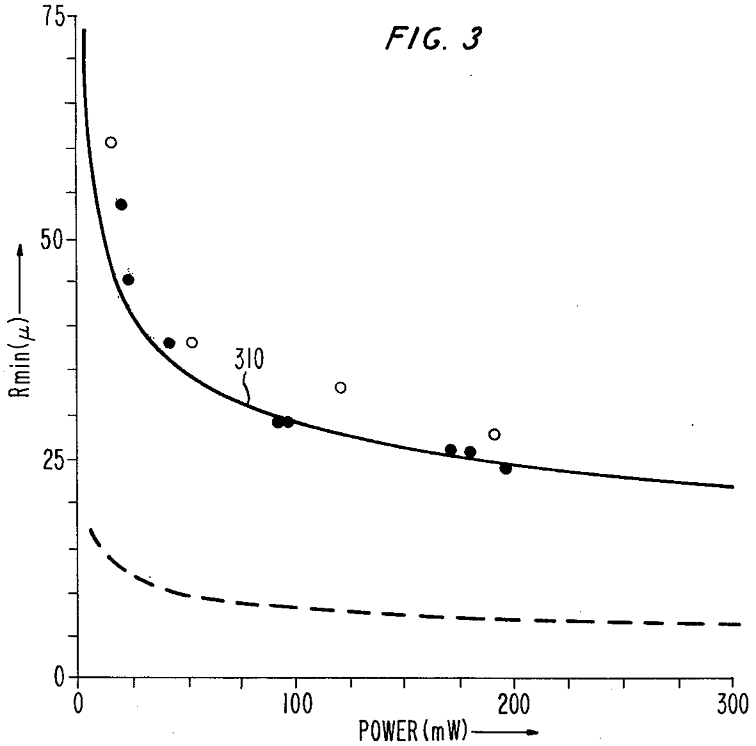
FIG. 3 shows, in graphical form, the minimum atomic beam focal spot diameter (FWHM) achievable for an atomic beam having a half-angular divergence $\Delta\theta = 1.8\times10^{-4}$ rad and a most probable atomic particle velocity $v_0 = 9\times10^4$ cm/sec with a $TEM_{00}$mode laser beam having a focal spot size $w_0 = 100\mu$ as a function of laser power, the closed circle data points being obtained with velocity selection in the particle beam and the open circle data points being obtained without velocity selection.
Figure 4:
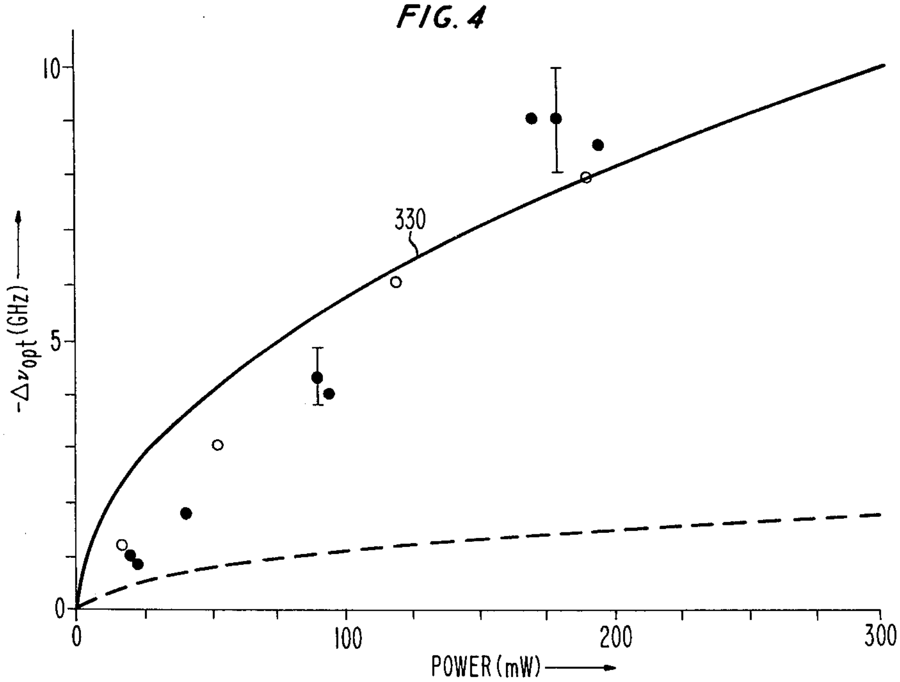
FIG. 4 shows, in graphical form, the laser frequency detuning from resonance which produces the maximum on-axis intensity (best focusing) for the atomic beam as a function of laser power for an atomic beam having a half-angular divergence $\Delta\theta = 1.8\times10^{-4}$ rad and a most probable atomic particle velocity of $v_0 = 9\times10^4$ cm/sec with a $TEM_{00}$ mode laser beam having a focal spot size $w_0 = 100\mu$.

The following shows how the above-described model fits the TEM$_{00}$ mode data produced by using the apparatus shown in FIG. 1. Solid curve 310 in FIG. 3 and solid curve 330 in FIG. 4 are calculated from EQS. 17 and 16 using the value $\Delta\theta = 1.8\times10^{-4}$ radians, which value gave a best fit to the variation of $R_{min}$. This value for $\Delta\theta$ falls about midway between the half-angular divergence of the umbra and of the penumbra of the atomic beam which were $1.0\times10^{-4}$ radians and $3.2\times10^{-4}$ radians respectively. The dashed curves in FIGS. 3 and 4 show the results of a similar calculation in which the effects of heating by the fluctuations of the spontaneous force were not taken into account. This clearly shows that $R_{min}$ is limited by quantum fluctuations.

The open and closed circles in FIG. 5 show the measured data points of the on-axis intensity of the focused atomic beam as a function of laser power. Also shown is curve 320 which is proportional to the value of $(1/R_{min})^2$ calculated by using EQ. 17. The agreement of curve 320 with the experimental data points indicates that a constant fraction of the atoms in the incident atomic beam are trapped by the light. Since the beam profiles for the atomic beam with and without the light have different shapes, the fraction of atoms trapped is determined by numerical integration of the beam profiles shown in FIG. 2. We find that roughly 20 percent of the incident atoms are confined to $r \leqq R_{min}/2$ and 40 percent to $r \leqq R_{min}$.

Most real atoms are not well-approximated by the idealized two-level model. This can lead to problems when attempting to apply the concepts discussed here. Consider, for example, the case of the sodium atom. The ground state of sodium is split by the hyperfine interaction into two levels separated by 1.77 GHz. It is reasonable to treat sodium as a two-level atom only when $|\Delta\nu_{opt}|$ is much larger than this splitting, as when $TEM_{00}$ mode light is used to guide the atoms in the above examples. For $TEM^*_{01}$ mode light, however, we found $|\Delta\nu_{opt}|$ is much smaller than the hyperfine splitting. For these cases the excitation rate for atoms in the two ground-state levels are unequal and this leads to optical pumping of the ground state and the simple concepts appropriate to the two-level atom no long apply. This is a well-known problem.

There are several ways to overcome this difficulty. One technique involves the use of two lasers tuned $\Delta\nu_{opt}$ away from each of the ground state transitions. Recent experiments on transverse deflection of atoms have shown that this is a means which avoids optical pumping while still making it possible to interact with all the atoms in the atomic beam. For a longitudinal interaction, however, $|\Delta\nu_{opt}|$ may be considerably less than the spread of longitudinal Doppler shifts in a typical effusive atomic beam. Thus only a fraction of the atoms in the beam would experience the optimum detuning. Indeed, some atoms might experience detunings of the wrong sign. Even if a single-speed atomic beam is used, the intensities of the two lasers should be adjusted so that the force experienced by atoms in either of the two ground-state levels are equal. If this is not done additional transverse heating of the atoms will occur as they shuttle back and forth between the ground-state levels.

It is advantageous to use $TEM^*_{01}$ mode laser beams, as opposed to $TEM_{00}$ mode light, to guide particle beams. For the same amount of quantum heating, deeper optical potential wells are obtained with $TEM^*_{01}$ mode light and the particles are more tightly confined to the laser beam axis. There are other advantages as well. First, because of the deeper potential wells, a larger fraction of the incident atomic beam will be captured by $TEM^*_{01}$ light. Alternatively, it should be feasible to guide atomic beams with larger values of $v_0\Delta\theta$. Secondly, $TEM^*_{01}$ mode light is better suited for the technique of using a mirror with a small hole in it to combine the particle and laser beams. In this technique the atoms pass through the hole and combine with the laser beam which is reflected off the mirror. Since the light is centered on the hole, there is a dark spot in the laser beam caused by the hole in the mirror and this causes problems which are particularly severe when using collimated $TEM_{00}$ light beam. A $TEM^*_{01}$ mode beam would be much less perturbed by reflection off such a mirror. A problem to be confronted is the difficulty of generating $TEM^*_{01}$ mode light in typical cw dye lasers. Note that it might be possible to approximate a $TEM^*_{01}$ mode beam by using the hollow beam which results when a collimated $TEM_{00}$ mode is reflected off a mirror with a hole in it.

A cw dye laser can be made to operate in the $TEM^*_{01}$ mode using the following technique. First the dye laser is pumped with a $TEM^*_{01}$ mode laser beam. Typically the pump laser is an argon ion laser; this type of laser can be forced to oscillate in the $TEM^*_{01}$ mode by introducing into the laser cavity a small opacque spot on the laser beam axis. This can be done with a small ink spot on a Brewster angle plate. The laser is prevented from oscillating in a higher order mode by the severe aperturing effects designed into the narrow bore or the laser tube. The second step in forcing the dye laser to lase in the $TEM^*_{01}$ mode is to introduce similar intracavity loss on the dye laser beam axis. In the typical dye laser cavity, however, it will usually also be necessary to introduce additional aperturing near the mirrors where the laser spot size is largest. This additional aperturing is necessary because dye laser cavities are usually fairly unrestricted and higher-order-mode operation could easily occur.

Figure 9:
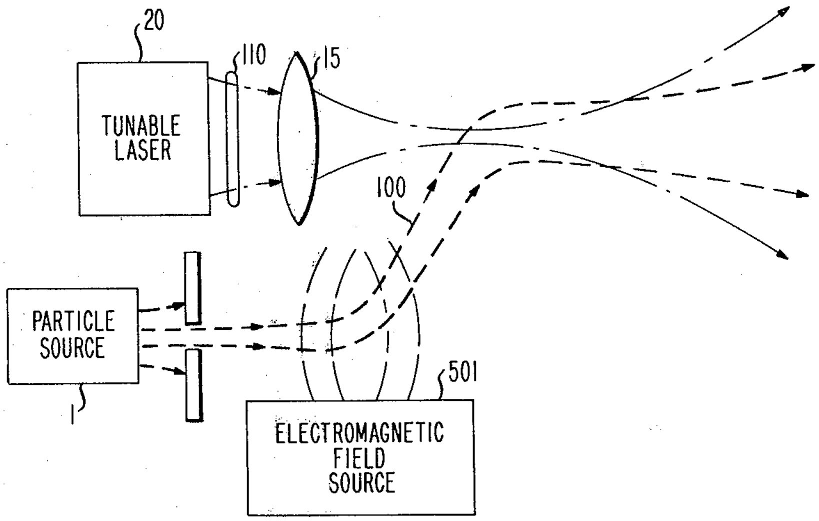
FIG. 9 shows, in pictorial form, an embodiment of the present invention which utilizes electromagnetic fields to bend a beam of particles.

It should be clear to those skilled in the art that the above-described invention may be practiced on beams of particles which are ions, electrons, as well as neutral atoms. Furthermore, the embodiment shown in FIG. 1 where the particle beam is passed through an aperture in a mirror is not the only means by which an electromagnetic wave may be superimposed upon a particle beam. For example, a beam of ions may be directed by a magnetic or electric field from electromagnetic field source 501 so as to be directed to copropagate with a beam of electromagnetic radiation such as a laser beam, as is shown in FIG. 9. Furthermore, an atomic beam may be directed by a gradient electric or magnetic field to travel along a direction so that it is superimposed upon a laser beam, as is also illustrated by FIG. 9. The production of the appropriate electromagnetic fields should be clear to those skilled in the art.

We claim:

1. Apparatus for focusing a beam of particles (100) which comprises:

laser means (20) for producing a beam of laser radiation (110);

means (15, 2) for superimposing said beam of laser radiation onto said beam of particles such that both beams propogate substantially along the same axis for an interaction region;

characterized in that said beam of laser radiation is a $TEM^*_{01}$ mode beam and said laser beam is detuned from a resonant transition for at least a portion of the particles in said beam of particles by an amount $\Delta\nu$ in the range of values determined by the steps of:

(1) evaluating the parameter 2R as a function of $\Delta\nu$ from the equation $$R^2 = \frac{w_0^4}{P}\ \frac{2\pi^3 hc}{\lambda^3 \Delta\nu_N}\left(\Delta\nu^2 + \frac{\Delta\nu_N^2}{4}\right)\left[\exp\left(\frac{2E_t}{h\Delta\nu}\right) - 1\right]$$

with $$E_t = \frac{m\nu_0^2\Delta\theta^2}{2}\left[1 + \frac{d}{\Delta\nu^{\frac{1}{2}}}\left\{1 + a\frac{\Delta\nu}{\Delta\nu^2 + \frac{\Delta\nu_N^2}{4}} + b\frac{1}{\Delta\nu^2}\right\}^{\frac{1}{2}}\right]^2$$

where $$d = \left[\frac{\pi^2 h\Delta\nu_N w_0^2}{3m\lambda^3\nu_0}\right]^{\frac{1}{2}}$$

$$a = \frac{\lambda^5\Delta\nu_N}{8\pi^5 cm\nu_0^2\Delta\theta}\ \frac{P}{w_0^4}$$

$$b = \frac{5\lambda^5 m^2\nu_0^4\Delta\theta^4}{32\pi^5 ch^3\Delta\nu_N}\ \frac{P}{w_0^4}$$

P is the laser power, $\nu_N$ is the natural linewidth (FWHM) of the particle resonance, c is the speed of light, λ is the wavelength of the laser radiation, m is the particle mass, h is Planck's constant, $v_0$ is the most probable particle velocity, $\Delta\theta$ is the half-angular divergence of the particle beam, $w_0$ is the laser beam focal spot size, and $\Delta\nu$, the laser detuning$=\nu-\nu_0$, $\nu$ being the laser beam frequency in the particle restframe and $\nu_0$ being the particle resonance frequence for 2R;

(2) determining the value of $\Delta\nu$ which minimizes 2R with $E_t=(m\nu_0^2\Delta\theta^2/2)$ which value shall be designated $(\Delta\nu_{opt})$ no heat;

(3) determining the value $(2R)_c$, the value of 2R for $\Delta\nu=(\Delta\nu_{opt})$ no heat, from the equation for $R^2$ in step 1; and (4) determining the range of values of $\Delta\nu$ between the intersections of the curve of 2R derived from the evaluation in step 1 and the curve $2R=(2R)_c$.

2. Apparatus as defined in claim 1 wherein said laser beam is detuned from said resonant transition by an amount determined by minimizing the parameter 2R from the equation $$R^2 = \frac{w_0^4}{P}\ \frac{2\pi^3 hc}{\lambda^3 \Delta\nu_N}\left(\Delta\nu^2 + \frac{\Delta\nu_N}{4}\right)\left[\exp\left(\frac{2E_t}{h\Delta\nu}\right) - 1\right]$$

with $$E_t = \frac{m\nu_0^2\Delta\theta^2}{2}\left[1 + \frac{d}{\Delta\nu^{\frac{1}{2}}}\left\{1 + a\frac{\Delta\nu}{\Delta\nu^2 + \frac{\Delta\nu_N^2}{4}} + b\frac{1}{\Delta\nu^2}\right\}^{\frac{1}{2}}\right]^2$$

where $$d = \left[\frac{\pi^2 h\Delta\nu_N w_0^2}{3m\lambda^3\nu_0}\right]^{\frac{1}{2}}$$

$$a = \frac{\lambda^5\Delta\nu_N}{8\pi^5 cm\nu_0^2\Delta\theta}\ \frac{P}{w_0^4}$$

$$b = \frac{5\lambda^5 m^2\nu_0^4\Delta\theta^4}{32\pi^5 ch^3\Delta\nu_N}\ \frac{P}{w_0^4}.$$

3. Apparatus for focusing a beam of particles (100) which comprises:

laser means (20) for producing a beam of $TEM_{00}$ mode laser radiation (110);

means (15,2) for superimposing said beam of laser radiation onto said beam of particles such that both beams propogate substantially along the same axis for an interaction region;

characterized in that said laser beam is detuned from a resonant transition for at least a portion of the particles in said beam of particles by an amount $\Delta\nu$ in the range of values determined by the steps of:

(1) evaluating the parameter 2R as a function of $\Delta\nu$ the equation $$R^2 = -\frac{2\pi^3 c}{\lambda^3\Delta\nu_N}\ \frac{m\nu_0^2\Delta\theta^2 w_0^4}{P}\left[1 + \frac{a}{\Delta\nu}\right]^2 \Delta\nu$$

where $$a = \left(\frac{h\Delta\nu_N^2}{6\pi m^2 c}\ \frac{P}{\nu_0^3\Delta\theta^2}\right)^{\frac{1}{2}}$$

P is the laser power, $\nu_N$ is the natural linewidth (FWHM) of the particle resonance, c is the speed of light, λ is the wavelength of the laser radiation, m is the particle mass, h is Planck's constant, $v_0$ is the most probable particle velocity, $\Delta\theta$ is the half-angular divergence of the particle beam, $w_0$ is the laser beam focal spot size and $\Delta\nu$, the laser detuning$=\nu-\nu_0$, $\nu_0$ being the laser beam frequency in the particle restframe and $\nu_0$ being the particle resonance frequency for 2R;

(2) determining the value of $\Delta\nu$ which minimizes 2R from the equation $$R^2 = -\frac{w_0^2}{2}\ln\left[\frac{1}{p(0)}\left\{(1 + p(0))\exp\left[\frac{m\nu_0^2\Delta\theta^2}{h\Delta\nu}\right] - 1\right\}\right]$$

with $$p(0) = \frac{\lambda^3\Delta\nu_N}{4\pi^3 hc}\ \frac{P}{w_0^2}\ \frac{1}{\Delta\nu^2 + \Delta\nu_N^2/4}$$

which value shall be designated $(\Delta\nu_{opt})$ no heat;

(3) determining a value $(2R)_c$ from the equation for $R^2$ in step 1 at $(\Delta\nu_{opt})$ no heat; and (4) determining the range of values of $\Delta\nu$ between the intersection of the curve of 2R, derived from the evaluation in step 1 and the curve $2R=(2R)_c$.

4. Apparatus as defined in claim 3 wherein said laser beam is detuned from said resonant transition by an amount determined by:

$$-\left(\frac{h\Delta\nu_N^2}{6\pi m^2 c}\ \frac{P}{\nu_0^3\Delta\theta^2}\right)^{\frac{1}{2}}.$$

5. Apparatus as defined in claim 1 wherein said means for superimposing comprises:

a mirror (2) having an aperture disposed so that a portion of said beam of particle passes through said aperture; and focusing means (15) for focusing said laser beam onto said mirror so that said laser beam is reflected from said mirror in such a manner that it is superimposed upon said beam of particles.

6. Apparatus as defined in claim 1 wherein said means for superimposing comprises:

means (501) for producing electromagnetic fields, which fields are disposed in the path of said beam of particles to bend said beam of particles in such a manner that it is superimposed upon said beam of laser radiation.

7. Apparatus as defined in claim 3 wherein said means for superimposing comprises:

a mirror (2) having an aperture disposed so that a portion of said beam of particle passes through said aperture; and focusing means (15) for focusing said laser beam onto said mirror so that said laser beam is reflected from said mirror in such a manner that it is superimposed upon said beam of particles.

8. Apparatus as defined in claim 3 wherein said means for superimposing comprises:

means (501) for producing electromagnetic fields, which fields are disposed in the path of said beam of particles to bend said beam of particles in such a manner that it is superimposed upon said beam of laser radiation.

* * * * *